United States Patent
Cushman et al.

[11] Patent Number: 6,125,287
[45] Date of Patent: Sep. 26, 2000

[54] WIRELESS TELEPHONE HAVING AN IMPROVED USER INTERFACE

[75] Inventors: William H. Cushman, Highland Village; M. Shaheen Saroor, Irving; Manijeh Moghis, Dallas; Alan Hameed, Richardson; Douglas N. Laube, Plano; Douglas M. Galletti, Plano; Anthony D. Shoemaker, Plano, all of Tex.

[73] Assignee: Fujitsu Limited, Kawasaki, Japan

[21] Appl. No.: 08/924,306

[22] Filed: Sep. 5, 1997

[51] Int. Cl.⁷ .............................. H04B 1/38; H04M 11/10
[52] U.S. Cl. .......................... 455/566; 455/564; 455/550; 455/575; 455/412
[58] Field of Search ................................. 379/93.17, 356, 379/355, 354, 457; 455/414, 566, 550, 412, 564, 575; 345/169, 172, 123, 341, 124, 156

[56] References Cited

U.S. PATENT DOCUMENTS

| | | | |
|---|---|---|---|
| 4,477,808 | 10/1984 | Ichikawa | 340/825.44 |
| 4,908,853 | 3/1990 | Matsumoto | 379/355 |
| 4,975,896 | 12/1990 | D'Agosto, III et al. | 369/29 |
| 5,125,078 | 6/1992 | Matsuda et al. | 345/56 |
| 5,134,717 | 7/1992 | Rasmussen | 455/564 |
| 5,267,308 | 11/1993 | Jokinen et al. | 379/354 |
| 5,303,288 | 4/1994 | Duffy et al. | 455/564 |
| 5,371,779 | 12/1994 | Kobayashi | 455/563 |
| 5,371,788 | 12/1994 | Baals et al. | |
| 5,384,825 | 1/1995 | Dillard et al. | 455/564 |
| 5,396,547 | 3/1995 | Baals et al. | |
| 5,402,477 | 3/1995 | McMahan et al. | 379/201 |
| 5,412,713 | 5/1995 | Baals et al. | |
| 5,425,077 | 6/1995 | Tsoi | 455/566 |
| 5,457,738 | 10/1995 | Sylvan | 379/93.23 |
| 5,483,591 | 1/1996 | Koma | 379/356 |
| 5,535,258 | 7/1996 | Joglekar et al. | 455/564 |
| 5,583,919 | 12/1996 | Talvard et al. | 379/88.03 |
| 5,590,189 | 12/1996 | Turnbull et al. | 379/356 |
| 5,633,912 | 5/1997 | Tsoi | 455/566 |
| 5,680,312 | 10/1997 | Oshizawa et al. | 702/202 |
| 5,687,216 | 11/1997 | Svensson | 455/412 |
| 5,737,394 | 4/1998 | Anderson et al. | 379/88.11 |

(List continued on next page.)

FOREIGN PATENT DOCUMENTS

| | | | |
|---|---|---|---|
| 0457077 | 11/1991 | European Pat. Off. | H04M 3/50 |
| 07129516 | 5/1995 | Japan | G06F 3/023 |

OTHER PUBLICATIONS

Mitsubishi Advertisement "Mobile Access 100 Series, Take Your Network on the Road.", (1997).

Motorola Star TAC Advertisement, "The Star TAC Select™ Series Digital Telephone . . . A Digital Fashion Statement.", (1997).

*Primary Examiner*—Reinhard J. Eisenzopf
*Assistant Examiner*—Charles N. Appiah
*Attorney, Agent, or Firm*—Staas & Halsey LLP

[57] ABSTRACT

A wireless telephone having a first directory having assigned memory locations with indicators associated therewith. Telephone numbers are stored in the respective memory locations. A speed dialer places a call to one of the telephone numbers stored in the memory locations of first directory upon entry of the indicator associated with the memory location. The wireless phone has a second directory and a sorting unit to order telephone numbers according to parameters associated with the telephone number, the telephone numbers are stored as ordered in the second directory. There are alphanumeric identifiers associated with the numbers stored in the second directory. The wireless phone has a telephone display, and a scroller allows the user to scroll up and down through the numbers stored in the second directory to sequentially view the alphanumeric identifiers associated therewith on the telephone display. The wireless telephone also has a function setting device for setting a plurality of parameters. A marking device selectively marks one or more parameters. A marked parameter directory causes the one or more parameters which have been marked to be displayed. A selector selects a parameter from the directory to thereby change the setting of the selected parameter.

30 Claims, 10 Drawing Sheets

U.S. PATENT DOCUMENTS

| | | | |
|---|---|---|---|
| 5,768,362 | 6/1998 | Moon | 379/356 |
| 5,774,540 | 6/1998 | Davidson et al. | 379/387 |
| 5,797,089 | 8/1998 | Nguyen | 455/403 |
| 5,831,598 | 11/1998 | Kauffert et al. | 345/168 |
| 5,841,849 | 11/1998 | Macor | 379/142 |
| 5,841,855 | 11/1998 | Davidson et al. | 379/387 |
| 5,842,124 | 11/1998 | Kenagy et al. | 455/418 |
| 5,852,783 | 12/1998 | Tabe et al. | 455/550 |
| 5,854,624 | 12/1998 | Grant | 345/169 |
| 5,903,832 | 5/1999 | Seppanen et al. | 455/414 |
| 5,930,350 | 7/1999 | Johnson | 379/355 |
| 5,952,942 | 9/1999 | Balakrishnan et al. | 341/20 |
| 5,983,073 | 11/1999 | Ditzik | 455/11.1 |

FIG. 2a

>1. Freq'ly Called #s
 2. Main Directory
 3. SEARCH

| SELECT | u/d | BACK |
| --- | --- | --- |
| | U/D | HOME |

FIG. 2b

>4. Protected #s

| SELECT | u/d | BACK |
| --- | --- | --- |
| | U/D | HOME |

FIG. 2c

>1. Last calls
 2. Protected #s
 3. Billing

| SELECT | u/d | HOME |
| --- | --- | --- |
| | U/D | |

FIG. 2d

4. Your phone #
 5. Directories

| SELECT | u/d | HOME |
| --- | --- | --- |
| | U/D | |

FIG. 2e

Enter name
_ _ _ _ _ _ _

| | MARK | BACK |
| --- | --- | --- |
| | SYMB | CANCEL |

FIG. 2f

Enter name
B _ _ _ _ _

| SEARCH | CLEAR | BACK |
| --- | --- | --- |
| | SYMB | CANCEL |

FIG. 2g

| >1. Best Eng. Co.  2. Brill, Edward  3. Yates, Bill |||
|---|---|---|
| SELECT | u/d | BACK |
| U/D | HOME | |

FIG. 2h

| 1. Anderson, Herb  2. Aurora Company  3. Best Eng. Co. |||
|---|---|---|
| ADD | U/D | BACK |
| SELECT | u/d | HOME |

FIG. 2i

| 8. Harris, Tim  9. Harris Comm.  10. Ignition |||
|---|---|---|
| ADD | U/D | BACK |
| SELECT | u/d | HOME |

FIG. 2j

| 56. Quimby, Sarah  57. Roberts, Jane  58. Woods, Tiger |||
|---|---|---|
| ADD | U/D | BACK |
| SELECT | u/d | HOME |

FIG. 2k

| Harris, Tim  214-899-3421 |||
|---|---|---|
| CALL | DELETE | BACK |
| EDIT | U/D | HOME |
| COPY | | |

FIG. 2ℓ

| DELETE  Harris, Tim? |||
|---|---|---|
| YES | NO | |

FIG. 2m

| Enter name |  |  |
|---|---|---|
| _ _ _ _ _ _ _ _ _ _ | | |
| Press ✶ for – –> | | |
| NEXT | CLEAR | BACK |
| A–>a | SYMB | CANCEL |

FIG. 2n

| Enter phone # |  |  |
|---|---|---|
| _ _ _ _ _ _ _ _ _ _ | | |
| ✶ for – –>; # for – | | |
| SAVE | CLEAR | BACK |
| | SYMB | CANCEL |

FIG. 2o

| 1 = , 4 = ( 7 = " | | |
|---|---|---|
| 2 = - 5 = ) 8 = : | | |
| 3 = # 6 = . 9 = ✶ | | |
| | U/D | BACK |

FIG. 2p

| 1 = ; 4 = + 7 = ' | | |
|---|---|---|
| 2 = ? 5 = = 8 = % | | |
| 3 = @ 6 = / 9 = $ | | |
| | U/D | BACK |

FIG. 2q

| COPY to Frequently Called #s? | | |
|---|---|---|
| YES | NO | |

FIG. 3a

Enter your PIN
_ _ _ _

| NEXT | CLEAR | BACK |
| HELP | MARK | CANCEL |

FIG. 3b

>1. Checking account
 2. VISA
 3. SSN

| SELECT | u/d | BACK |
| ADD | U/D | HOME |
| MOVE | | |

FIG. 3c

>4. AA gate info
 5. Tax ID #
 6. Passport

| SELECT | u/d | BACK |
| ADD | U/D | HOME |
| MOVE | | |

FIG. 3d

Checking account
214-856-1132
17654876# 0677#

| CALL | u/d | BACK |
| EDIT | DELETE | HOME |

| CALL | u/d | BACK |
| EDIT | DELETE | HOME |

FIG. 3f

In use . . .
214-856-1132
Checking account

| MUTE | | NEXT # |

FIG. 3g

Checking account
214-856-1132
17654876# 0677#

| | u/d | BACK |
| | | RETURN |

| | u/d | BACK |
| | | RETURN |

FIG. 3i

| VISA 4232 0067 4543 0356 11/97 | | |
|---|---|---|
|  | u/d | BACK |
| EDIT | DELETE | HOME |

FIG. 3j

| VISA 4232 0067 4543 0356 11/97 | | |
|---|---|---|
| NEXT # | u/d | BACK |

FIG. 3k

| No entries | | |
|---|---|---|
| ADD |  | BACK |
|  |  | HOME |

FIG. 3ℓ

| Enter description _ _ _ _ _ _ _ _ _ Press * for - -> | | |
|---|---|---|
| NEXT | CLEAR | BACK |
| A->a | SYMB | CANCEL |

FIG. 3m

| Phone # (optional) _ _ _ _ _ _ _ _ _ * for - ->; # for - | | |
|---|---|---|
| NEXT | CLEAR | BACK |
|  | SYMB | CANCEL |

FIG. 3n

| Enter #s _ _ _ _ _ _ _ _ _ * for - ->; # for - | | |
|---|---|---|
| SAVE | CLEAR | BACK |
|  | SYMB | CANCEL |

FIG. 4i

```
>1. XYZ Telecom
 2. AT&T – Tim S
 3. MCI
```
| SELECT | u/d | BACK |
|---|---|---|
| ADD | U/D | HOME |
| MOVE | | |

FIG. 4j

```
XYZ Telecom
Enter # to call
_ _ _ _ _ _ _
```
| CALL | CLEAR | BACK |
|---|---|---|
| EDIT | DELETE | CANCEL |
| GET # | | |

FIG. 4k

```
In use. . .
1-800-621-3167
XYZ Telecom
```
| MUTE | | NEXT # |
|---|---|---|

FIG. 4ℓ

```
 8. Harris, Tim
 9. Harris Comm.
10. Ignition
```
| | U/D | BACK |
|---|---|---|
| SELECT | u/d | HOME |

FIG. 4m

```
Harris, Tim
214-899-3421
```
| COPY # | | BACK |
|---|---|---|
| | U/D | HOME |

FIG. 4n

```
AT&T – Tim S
972-897-5676
```
| CALL | | BACK |
|---|---|---|
| EDIT | DELETE | CANCEL |

FIG. 4o

```
In use. . .
1-800-225-5288
AT&T – Tim S.
```
| MUTE | | NEXT # |
|---|---|---|

FIG. 5a

>1. Std ring
2. Ring ON/OFF
3. Lock phone

| SELECT | u/d | HOME |
|--------|-----|------|
| MOVE | U/D | REMOVE |

FIG. 5b

4. Ring volume

| SELECT | u/d | HOME |
|--------|-----|------|
| MOVE | U/D | REMOVE |

FIG. 5c

Ring is OFF

| OK | UNMARK | CHANGE |

FIG. 5d

Ring is ON

| OK | UNMARK | CHANGE |

FIG. 5e

>1. Ring ON/OFF
2. Type of ring
3. Ring volume

| SELECT | u/d | BACK |
|--------|-----|------|
| | | HOME |

FIG. 5f

>1. Standard
2. Vibration
3. Beep

| SELECT | u/d | BACK |
|--------|-----|------|
| | U/D | HOME |

FIG. 5g

Vibration

Press ✶ to test

| OK | MARK | BACK |
|----|------|------|
| | | CANCEL |

FIG. 5h

Item will be put in 1-key access list

| OK | | BACK |
|----|--|------|
| | | CANCEL |

FIG. 6a

| 1. Office  |     |      |
| 2. Ignition |     |      |
| 3. Home    |     |      |
| ADD | U/D | BACK |
| SELECT | u/d | HOME |
| MOVE | | |

FIG. 6b

| 4. J.R. |     |      |
| 5. Jim  |     |      |
| 6. Jill |     |      |
| ADD | U/D | BACK |
| SELECT | u/d | HOME |
| MOVE | | |

FIG. 6c

| Enter number |       |      |
| of item to   |       |      |
| MOVE –       |       |      |
| NEXT | CLEAR | BACK |
| | | CANCEL |

FIG. 6d

| 1. Std ring     |          |      |
| 2. Ring ON/OFF  |          |      |
| >3. Lock phone  |          |      |
| UP | END MOVE | DOWN |

FIG. 6e

| 1. Std ring     |          |      |
| >2. Lock phone  |          |      |
| 3. Ring ON/OFF  |          |      |
| UP | END MOVE | DOWN |

FIG. 6f

| >1. Std ring    |       |        |
| 2. Lock phone   |       |        |
| 3. Ring ON/OFF  |       |        |
| SELECT | u/d | HOME |
| MOVE | U/D | REMOVE |

WIRELESS TELEPHONE HAVING AN IMPROVED USER INTERFACE

BACKGROUND OF THE INVENTION

1. Field of the Invention

The present invention relates in general to wireless telephones. More specifically, the present invention relates to a wireless telephone, and user interface thereof.

2. Description of the Related Art

Conventional wireless telephones have directories for stored telephone numbers. The numbers are stored in designated memory locations, and the user can make a call to a number stored in the directory by entering the memory location for that number and pressing the SEND key. With increasing capabilities, phones are able to store more and more numbers. However, it is difficult for a user to remember the numerical location of all the numbers. Furthermore, it is difficult to rearrange the position of the numbers within the directories.

Conventional wireless telephones also have function keys to activate various features. However, to increase the number of features which can be activated at one time, it is necessary to increase the number of function keys or the number of functions assigned to each key. The former approach increases the size of the phone and hardware costs associated with the phone. The latter approach is limited by the number of labels that can be placed on a single key (usually no more than two) without adversely affecting usability and/or aesthetics.

Furthermore, the directories currently available have a set format, and do not allow the user to perform special functions. For example, if the user wanted to look up a number in the middle of a phone call, and then perhaps transmit a number, this would not be available. Also, if a calling card was required to make a call, much information would have to be entered manually.

With increasing complexity, more and more keystrokes are required to set the numerous features of the phone. This taxes the user.

SUMMARY OF THE INVENTION

Accordingly, it is an objective of the present invention to provide a wireless telephone in which it is not necessary to remember numerous memory locations to access stored numbers.

It is a further object of the present invention to allow the user to quickly and easily learn what information is stored in a memory of a phone by allowing the user to review a list of names assigned respectively to the stored records.

It is still a further object of the present invention to allow a small set function keys to be used to activate many functions thereby improving product usability and reducing product development costs.

It is yet another object of the present invention to allow a user to control various features within the phone without requiring numerous keystrokes.

These and other objects are accomplished with a wireless telephone having a first directory having assigned memory locations with indicators associated therewith. Telephone numbers are stored in the respective memory locations. A speed dialer places a call to one of the telephone numbers stored in the memory locations of first directory upon entry of the indicator associated with the memory location. The wireless phone has a second directory and a sorting unit to order telephone numbers according to parameters associated with the telephone number, the telephone numbers are stored as ordered in the second directory. There are alphanumeric identifiers associated with the numbers stored in the second directory. The wireless phone has a telephone display, and a scroller allows the user to scroll up and down through the numbers stored in the second directory to sequentially view the alphanumeric identifiers associated therewith on the telephone display.

The wireless telephone has a plurality of telephone function keys, and the telephone display has an information field and a function field. The function field identifies the function of the function keys. A telephone switching key is provided for changing the display in the function field and the function of the function keys.

The wireless telephone may also have a calling card directory to hold predetermined numbers and to hold empty place holders. In this case, the telephone display requests the user to enter a variable number for insertion into the empty place holder. This occurs when the calling card directory is accessed. The wireless telephone has a transmitter to transmit the predetermined number and to transmit the variable number after transmitting the predetermined number.

The wireless telephone also has a function setting device for setting a plurality of parameters. A marking device selectively marks one or more parameters. A marked parameter directory causes the one or more parameters which have been marked to be displayed. A selector selects a parameter from the directory to thereby change the setting of the selected parameter.

BRIEF DESCRIPTION OF THE DRAWINGS

The invention will be readily understood by reference to the following description of specific embodiments described by way of example only, with reference to the accompanying drawings, wherein:

FIGS. 2a through 2q are screens appearing in the display of the telephone of FIG. 1, for describing general features and directories of the telephone;

FIGS. 3a through 3n are screens appearing in the display of the telephone of FIG. 1, for describing a protected numbers feature of the telephone;

FIGS. 5a through 5h are screens appearing in the display of the telephone of FIG. 1, for describing a one key access feature of the telephone; and FIGS. 6a through 6f are screens appearing in the display of the telephone of FIG. 1, for describing a move feature of the telephone.

DETAILED DESCRIPTION OF THE PREFERRED EMBODIMENTS

Figure 1:
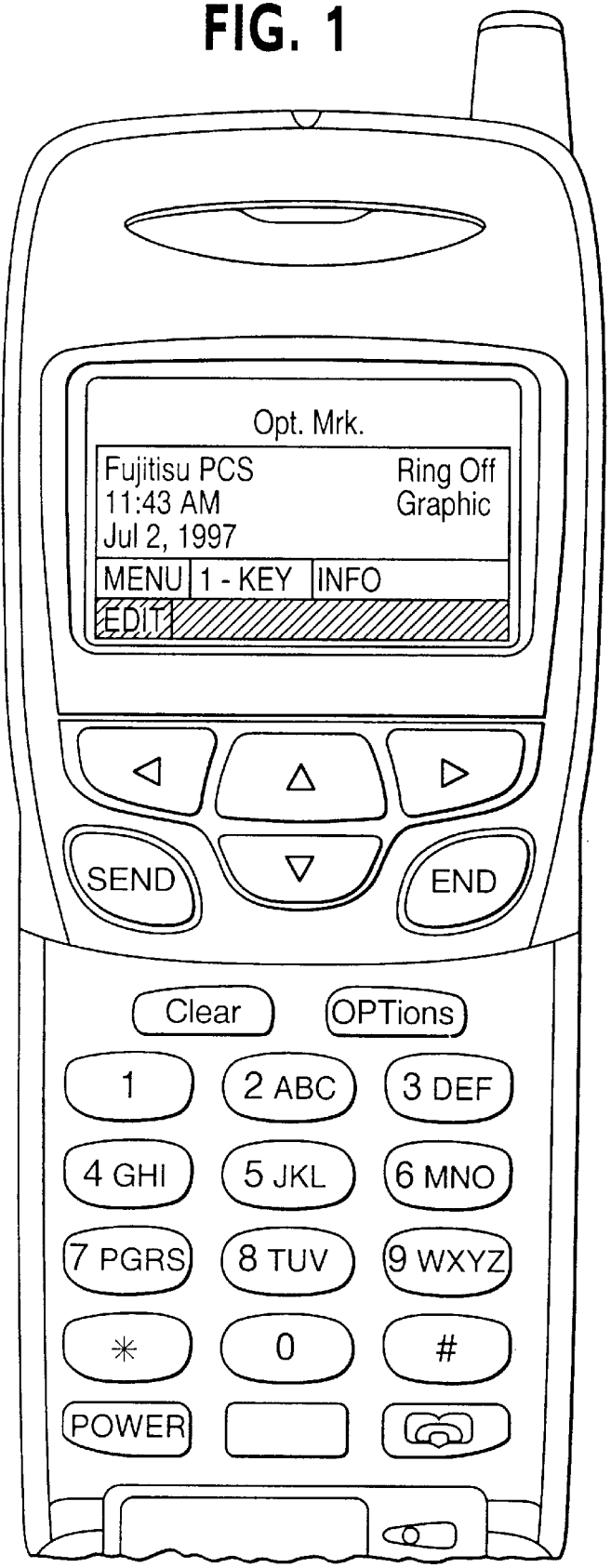
FIG. 1 is a top view of a wireless telephone according to the present invention.

FIG. 1 is a top view of a wireless telephone according to the present invention. The phone user interface has alpha numeric keys 1–0 along with the conventional # and * keys. The wireless phone further has four function keys in the shape of up, down, left and right arrows. The wireless phone has a visual display which may be a liquid crystal display (LCD) or other suitable type of flat-panel display that serves as the screen. Normally, the bottom line of the screen (i.e., the fourth line for a 4-line display) is a task bar which indicates the current function assignments for the function keys. See FIG. 1. To activate the "MENU", the user presses the left arrow key. To activate the "1-KEY" feature, the user presses the up arrow key. The right arrow key is pressed to activate the "INFO" function. "EDIT" (line 5, shaded) is not displayed in the task bar because that function is not currently available. It becomes available only when the function assignments for the arrow keys are changed as described below.

As shown in FIG. 1, an indentifier "OPT" icon appears on top of the screen. When the OPT icon is activated present, the dedicated OPTions key (just above the keypad for the embodiment shown in FIG. 1) may be used to change the current function assignments for the arrow keys. That is, when the OPT icon is activated, the function keys have a plurality of functions. For example, with the screen in FIG. 1, pressing the OPTions key once changes the current function assignments from "MENU", "1-KEY", and "INFO" to "EDIT" only. "EDIT" is displayed in the left position of the task bar, and "MENU", "1-KEY", and "INFO" are no longer visible. Pressing the left arrow key activates the EDIT function. Pressing either the up arrow key or the right arrow key has no effect. Pressing the OPTions key for a second time returns the original set of function assignments; "MENU", "1-KEY", and "INFO". "EDIT" is no longer visible, and the EDIT function is no longer available.

If the bottom down arrow key has a purpose, its current function is shown in the middle screen section of the task bar where 1-KEY is shown in FIG. 1. For example, up arrow and down arrow graphics may be displayed in the middle section indicating that the up and down arrow keys allow the users to scroll up and down on the screen. Besides scrolling, other options are possible, and the function of the upper key may be separated from the function of the lower key with a backslash "/". Note that the phone shown in FIG. 1 has arrows on the function keys and has the function keys arranged in a cross formation. However, the phone is in no way restricted to this embodiment.

Referring to FIG. 1, a dedicated directories key is provided at the lower right of the key pad (appears as a phone book). The directories key can be used to access the directories menu shown in FIGS. 2a and 2b. Alternatively, to access the screens of FIGS. 2a and 2b, the user could select INFO from the home screen (see FIG. 1) by depressing the right arrow key. Upon depressing INFO, an INFO menu, shown in FIGS. 2c and 2d is displayed. The user can scroll down or page down from FIG. 2c to display FIG. 2d. When "5. Directories" is displayed, depressing the 5 key moves from the FIG. 2d screen to the FIG. 2a screen. Alternatively, to select "5. Directories" from FIG. 2d, the cursor can be moved to the left of "5. Directories" using the up and down arrow keys (u/d choices in the task bar), and the left arrow key (SELECT) is pressed to complete the task. There are thus multiple paths to achieve the directories menu.

Frequently called numbers (the first directory) are reserved for memory locations 1–8. A main directory (the second directory), in which entries are alphabetically arranged, is reserved for memory locations 10–99. Memory location 9 is reserved for 911 or another emergency number. Entries in the frequently called numbers directory can be moved from one memory location to another so that the arrangement of the list can be manipulated to suit the user. This feature is described later with reference to FIGS. 6a–6f. Entries in the main directory are alphabetically arranged and can not be moved. The user can browse through any directory list (e.g., screens shown in FIGS. 2h, 2i, and 2j), individual directory listings (e.g., the screen shown in FIG. 2k), other list, or menu using the scrolling and paging functions. Up and down arrow graphics in the task bar that have thin lines (represented by "u" and "d" in the figures) show that a line-by-line scrolling mode is active. Up and down arrows graphics in the task bar that have thick lines (represented by "U" and "D" in the figures) indicate that the paging mode (i.e., page-by-page scrolling) is active. For example, if the screen of FIG. 2a is shown and the user (1) depresses the OPTions key to activate paging and then (2) presses the down arrow key, the screen shown in FIG. 2b appears.

In FIG. 2a, "3. SEARCH" indicates a search function, and a search engine may be launched by selecting item 3 in the directories menu (FIGS. 2a and 2b). The search engine searches through both the frequently called numbers and the main directory. When item 3 is selected at the screen of FIG. 2a, the screen of FIG. 2e appears. A name is entered by using the letters appearing on the conventional twelve button keypad shown in FIG. 1. Depressing a key once selects the first letter on the keypad, depressing the key twice quickly in succession selects the second letter appearing on the keypad, and so on. For example, if the 2 key is depressed twice in succession, a "B" will appear as the first character. For a number to be entered, the key is depressed one extra time. For example, depressing the 2 key four times displays the number 2. The cursor advances to the next position after a predetermined interval.

The search may be started at any time after one character has been entered. For example, in FIG. 2f, the left arrow key (see FIG. 1) would activate the SEARCH function. Activating the CLEAR function in FIG. 2f erases the character immediately to the left of the cursor. When the CLEAR key (up arrow key) is held for a predetermined time, all characters to the left of the cursor are erased. The BACK function shown in FIGS. 2e and 2f goes back to a previous screen. In FIGS. 2e and 2f, if the OPTions key is depressed, SYMB and CANCEL are displayed in the task bar and become available for use. When the SYMB function is accessed (FIGS. 2o and 2p), various symbols are displayed on the screen, and these symbols can be selected for characters in the search line. With the CANCEL key, the user is returned to the home screen shown in FIG. 1 without saving the changes associated with the current screen, or last n screens if the task is a sequential task. Thus, in this example, CANCEL would cancel the search.

SEARCH is activated by depressing the left arrow key (FIG. 2f). Searching looks for alphanumeric strings specified by the user. However, it returns only records in which one of the words begins with the string specified. For example "BIL" would return "Bilson, Carol" and "Yates, Bill" but not "Sybil S."

Searching proceeds from the beginning of the directory of frequently called numbers and then from the beginning of the main directory. The search results are displayed in a list in the order in which they were retrieved (see FIG. 2g). Individual records (name and phone number) may be examined by selecting names from the search list. For example, to display the Bill Yates record, at FIG. 2g the user would move the cursor to "3. Yates, Bill" and then depress the left arrow key to select. Alternatively, the number 3 key could be depressed anytime "3. Yates, Bill" is displayed on the screen.

If the user does not wish to search, but simply selects "2. Main Directory" at FIG. 2a, the first page of the main directory list (FIG. 2h) is displayed. FIGS. 2h–2j are a few possible screens from the main directory list. To display a specific record (name and phone number) for a specific person or business, the user scrolls through the main directory list and makes a selection using one of the methods described previously. For example, if the user selects "8. Harris, Tim" at the screen of FIG. 2i, the screen of FIG. 2k will be displayed. To delete the Tim Harris record, the DELETE function is activated with the up arrow key, and the screen shown in FIG. 21 is displayed. YES is entered to delete the Tim Harris record.

A new record name and phone number may be added to a directory by selecting ADD (pressing the left arrow key) while viewing any page in the main directory (see FIGS. 2h–2j). When ADD is depressed, the screen of FIG. 2m appears. The user enters the name information in the usual way (sequential key, e.g., depress the 5 key three times for an "L".) For lower case letters, the OPTions key is used to activate the second line of the task bar, and then the left arrow key is used. The "*" key is used to enter a space. CLEAR (up arrow key) is used to correct errors. As previously mentioned, symbols are also available, and the screens of FIGS. 2o and 2p are used for this purpose. At FIG. 2o, depressing the 8 key will enter a colon in the "name" field of the screen shown in FIG. 2m.

After the name information has been entered correctly, the NEXT key (left arrow key) brings up the screen for entering the phone number, FIG. 2n. Again, the "*" key is used for a space. To enter a dash "-" the "#" key is used. The record (name and phone number) can be saved by depressing the SAVE key (left arrow key) after the number has been entered. The record will automatically be placed in alphabetical order in the main directory.

A call can be made while viewing the directory list (FIGS. 2h–2j) or while viewing a particular record. To make a call from the directory list, the user pages or scrolls through the directory names until the name of the person or company to be called appears on the screen. Then, the user selects the record in the directory list and depresses the SEND key (see FIG. 1). For example, to call Tim Harris from the screen in FIG. 2i, "8. Tim Harris" is selected using one of the methods previously described. Then the SEND key is used to make the call. A person or company may also be called by depressing CALL (left arrow key) while viewing the directory record at the screen of FIG. 2k. As still a further alternative, the SEND key can be used at the screen of FIG. 2k.

It should be noted that the frequently called numbers directory operates substantially the same way, with regard to adding and deleting records and making a call, as the main directory. That is, when frequently called numbers is selected at the screen of FIG. 2a, a list of frequently called numbers appears in the same form as the screens shown in FIGS. 2h and 2i. Furthermore, when the user selects a record from the list of frequently called numbers, the record appears as shown in FIG. 2k. Note however that there are eight memory locations for frequently called numbers. Therefore, the ninth and tenth entries in FIG. 2i would not apply.

To copy a record from one directory to another directory, the record is displayed such that the phone shows a screen such as FIG. 2k. From FIG. 2k, the user depresses the OPTions key twice to activate and display the third line in the task bar. With the left arrow key, the copy feature is launched, and the screen shown in FIG. 2q is displayed. The user is asked to confirm the copy request with the left arrow key or to cancel the copy request with the up arrow key. Note that if the user were copying a record from the frequently called numbers to the main directory, FIG. 2q would instead read "COPY to Main Directory?".

When viewing a record (see FIG. 2k), it is possible to go to the immediately preceding or immediately following record in the directory list with the paging function. For example, if the Tim Harris record is being displayed (FIG. 2k), the Harris Comm. record can be displayed without going back to the screen of FIG. 2i. Referring to FIG. 2k, this is done by depressing the OPTions key and using the up and down arrow keys. This type of forward and backward paging (going from one complete record to another without returning to a directory list) can also be done while viewing a record selected from the search lists (FIG. 2g). For example, if the user wishes to scroll from the Yates entry, the third record is selected and the up and down arrow key are used. Alternatively, the user can likewise scroll from the Best or Brill entries. It is important to note that scrolling of this type proceeds according to the order of record in the main or frequently called number directories. That is, the user scrolls to records other than those in the search list.

As mentioned above, the frequently called numbers directory is substantially similar to the main directory. One difference is the move function. Another difference is that a call can be placed to the phone number stored in the frequently called numbers directory using a turbo dialing feature. This feature operates at the home screen (see FIG. 1). The user can place a call to a frequently called number by simply holding down the key corresponding to the record. For example, if Tim Harris' number were stored in frequently dialed memory location 6, Tim Harris could be called by holding down the 6 key for a predetermined interval while viewing the home screen. No other action is required.

Referring to FIGS. 2a and 2b, the phone further has a protected numbers feature, and this feature will now be described with reference to FIGS. 3a–3n. The protected numbers feature can be accessed from the home screen (see FIG. 1) using the INFO menu (see FIGS. 2c and 2d), and selecting "2. Protected #s". Alternatively, the user may obtain access to the protected numbers feature through the directories menu (see FIGS. 2a and 2b) which is accessed through the dedicated directories key or by selecting "5. Directories" at the INFO menu of FIG. 2d. At the directories menu of FIGS. 2a and 2b, "4. protected #s" is selected.

After the protected numbers feature is accessed, the screen of FIG. 3a is displayed, requesting the user to enter a personal identification number (PIN). After the PIN is entered, the current listing of protected numbers records (also referred to as the menu for protected numbers) is displayed (FIGS. 3b and 3c). The protected numbers feature may be used to store information such as PINs, credit card numbers, social security numbers, tax numbers, important dates, etc.

There are two types of information which may be stored in the records of the protected numbers feature. An example of a first type of record is shown in FIGS. 3d and 3e. This type of record is used primarily for interacting with automated information systems. The first line of the record ("Checking account" in this example) is the title or description that appears in the protected numbers menu (see FIGS. 3b and 3c). The second line in the record is the phone number of the automated phone system. In this example, the phone number is the number for the bank's automated teller system. It is possible to call the bank in the same manner described above with regard to the main directory. All lines after the second line of the record contain information that can be viewed or sent as touch-tones using a NEXT # key, described below. Note that if only one line of numeric information is entered, the up and down option ("u/d") would not be available at the screen of FIG. 3d, and the screen of FIG. 3e, the second screen of the record, would not be used.

After a call has been placed to the auto teller system by pressing CALL (left arrow key) or SEND while viewing the screen shown in FIG. 3d, the screen of FIG. 3f appears. In this example, the auto teller then prompts the user to enter an account number followed by the "#" symbol. To do this, the user depresses the right arrow key to send the next number (17654876#) as a touch tone string. The auto teller then prompts the user to enter a bank PIN followed by the # symbol. The user depresses the right arrow key for a second time to send the next number (0677#). The auto teller then prompts the user to enter 1 for checking, etc. By comparing FIGS. 3d and 3f, it should be apparent that after the call has been placed, the protected numbers are not displayed. However, in other embodiments the number could be displayed, particularly where there is a need for verification before sending the numbers.

Note that the first type of protected number can be retrieved during a phone call normally dialed or placed through the main directory or frequently called numbers directory. This retrieval is done by depressing the Directories key at the lower right portion of the key pad. The directories menu will appear (see FIGS. 2a and 2b), and the user can select "4. Protected #s". The user then enters a PIN and selects a protected numbers record of the first type from the list of protected records shown in FIGS. 3b and 3c. If "1. Checking account" is selected, the screens of FIGS. 3g and 3h appear. However, the numbers can not be sent as DTMF tone strings, that is, "NEXT #" is not displayed. Note that by using the OPTions key and then the right arrow key, the user can RETURN to the screen which appeared before activating the protected number feature.

The second type of protected numbers will now be described. The second type of protected numbers differs from the first type in that the second type does not contain a phone number. The second type of record is used primarily to store personal information that can be displayed on an as-needed basis. The numbers in the second type can be viewed and/or sent as DTMF tone strings while a call is in progress. FIG. 3i is a screen which would appear after selecting a protected number of the second type. The first line of the record is "VISA," and all other lines contain numeric information which can be viewed and/or sent as DTMF tone strings. A call can not be initiated from the second type of protected number. The screen of FIG. 3i appears when the protected number feature is activated while the user is not making a phone call. Note that the up and down (u/d) arrows would not be used when the data record has only three lines of data because the scrolling feature is not available.

If the user wants to access a protected number of the second type during a call, this can be done by using the directories key in the lower right corner of the keypad as described for the first type of protected numbers. The user may need to use the second type of protected numbers during a call because the user did not have a paper and pencil to write down the Visa number and expiration date before making the call, for example. After locating a record from the second type of protected numbers during a call, FIG. 3j appears. Comparing FIG. 3j with FIG. 3i, it should be apparent that the "NEXT #" does not appear in FIG. 3i. By using the second type of protected number while making a call, the user can either read the numbers to the order clerk or send the numbers as DTMF tone strings. Sending is done with "NEXT #" and the left arrow key.

When there are no records associated with the protected numbers feature (initially or after all records have been deleted), the screen of FIG. 3k appears. The user can select ADD. Alternatively, ADD may be selected from the protected numbers main menu (see FIGS. 3b and 3c). After ADD has been selected, the screen of FIG. 3l appears, requesting the user to enter a description which will appear in the protected numbers main menu. The description is entered as described previously, using symbols, the asterisk "*" for a space, and CLEAR to correct errors. The user enters NEXT after entering the description, and the screen of FIG. 3m appears at which the user enters numeric input and symbols for a phone number. If the user does not wish to enter a phone number, NEXT is used to arrive at the screen of FIG. 3n. At the screen of FIG. 3n, the user enters the various numbers. Note that if a space is placed in the phone number, the phone will ignore the space and dial the complete number. Spaces, however, are used as delimiters for touch tone strings being entered at the "Enter #s" screen (FIG. 3n). DTMF tone strings being sent during a call are terminated whenever a space is encountered. Hence, the user must insert spaces in appropriate places when programming this feature. SAVE (left arrow key) will save record."

Figure 4A:
FIGS. 4a through 4o are screens appearing in the display of the telephone of FIG. 1, for describing a calling card feature of the telephone.

A calling card feature will now be described with reference to FIGS. 4a–4o. The calling card feature allows the user to make long distance phone calls using a calling card (AT&T, MCI, Sprint, etc.) without having to enter all the required numbers (phone number of service, calling card number, PIN, etc.) for each call. The calling card feature is accessed from the home screen (see FIG. 1) with the left arrow key to activate MENU. This brings up a feature menu screen shown in FIGS. 4a and 4b. "4. Calling Card" is selected at the screen of FIG. 4b.

There are two ways the calling card feature can be used. First, a generic record can be created in which the calling card information (phone number of long distance service, calling card number, PIN, etc.) is stored for automatic transmission. However, with this first way, the phone number of the party to be finally called is not stored. Second, a specific of record can be created in which both the calling card information and the phone number of the party to be finally called are stored. Adding a calling card record is similar to adding a new record to the protected numbers feature. When the calling card feature is activated and there are no records, the screen of FIG. 4c appears. New records may be added by selecting ADD at FIG. 4c. As will be apparent later, it is also possible to add records when viewing a list of existing records.

Figure 4B:
Figure 4C:
Figure 4D:
Figure 4E:
Figure 4F:
Figure 4G:
Figure 4H:

After selecting ADD, the screen of FIG. 4d appears in which the user is requested to enter the card name. After completing this task, using NEXT causes the screen at FIG. 4e to appear. At the screen of FIG. 4e, the user is requested to enter the phone number of the long distance company, usually a 1-800 number. Using NEXT, causes the screen of FIG. 4f to appear. At the screen of FIG. 4f, the user enters the appropriate numbers required by the calling card service. The numbers must be entered in the correct sequence using spaces as delimiters. (This rule also applies to the protected numbers feature described earlier.) For example, if the company issuing the calling card requests the calling card number followed by the PIN, these numbers must be entered in this order, separated by a blank space. FIG. 4g is a screen showing the type of numbers entered at FIG. 4f, but actually FIG. 4g would appear when editing a record using the phone's full screen editor. Note the pair of quotation marks with no numbers or letters therebetween. The placement of quotation marks signifies where the calling card company would ask for the phone number to be called. In this case, the number to be called is the third piece of information requested. The fact that there are no numbers between the quotation marks indicates that this is a generic record in which the user will be requested each time to enter the number of the party to be finally called. The numbers within the quotation marks (see the screen of FIG. 4h) indicates that a specific calling card record is being edited, which record will only call the number shown within the quotation marks as the final number. As with the protected numbers, each string of numbers must be separated by a blank space. Note that the quotation marks are entered using the symbol function and the screens of FIGS. 2o and 2p. After all numbers have been entered at the screen of FIG. 4f, SAVE (left arrow key) completes the record.

Using the generic calling card feature will now be described. As mentioned above, the calling card feature is accessed from main menu (FIGS. 4a and 4b). Upon choosing "4. Calling card" the user is prompted to enter a PIN (see FIG. 3a). After selecting NEXT at FIG. 3a, the screen of FIG. 4i appears. If "1. XYZ Telecom" is selected, the phone recognizes that this record contains a pair of quotation marks with no numbers therebetween. The phone thus requests the user to enter the number of the party to be finally called at the screen shown in FIG. 4j.

The user enters the number and selects "CALL" with the left arrow key. The screen of FIG. 4k appears after the call has been connected. The user depresses the left arrow key to send the NEXT # as DTMF tone strings. Note that at this point, the phone knows the final telephone number to be called. XYZ telecom now prompts the user to send the calling card number, PIN, and phone number to be called. The user transmits each of these numbers as a separate DTMF string by pressing NEXT # (right arrow key) one time for each string in response to the prompts.

At the screen of FIG. 4j, rather than entering a phone number, the user could have retrieved a number from one of the phone directories. To do this, the user would get the number by hitting the OPTions key twice followed by the left arrow key for "GET #". The phone then provides the user with the directories menu (see FIGS. 2a and 2b) at which the user can select from one of the directories or search. The task bar choices in the directories are somewhat different in the list of directory records when GET # has been used to obtain access. For example, if the user wanted to call Tim Harris, entry 8 could be selected from the screen of FIG. 4l. Compare FIGS. 2i and 4l and note that the ADD feature is not available when the GET # has been used. After selecting "Harris, Tim", the screen of FIG. 4m appears. The user chooses COPY #, and FIG. 4j reappears with the Tim Harris phone number below "Enter # to call".

The method of using the specific calling card feature will now be described. At the menu of FIG. 4i, the user may have selected "2. AT&T—Tim S". In this record, the Tim S. phone number has already been entered within the quotation marks.

The screen of FIG. 4n would appear. To place the call, the user selects CALL using the left arrow key. When the call has been answered, the screen of FIG. 4o is displayed, and voice prompts from AT&T instruct the user to enter a calling card number, a PIN, a phone number to be called, etc. After each prompt from AT&T, the user depresses the right arrow key for NEXT # to send the appropriate DTMF tone string, one at a time, in the order preprogrammed.

A one key access feature will now be described with reference to FIGS. 5a–5h. One key access is a productivity enhancing feature that allows the user to have direct access to features without using menus. More specifically, "shortcuts" to individual screens are created by "marking" them as described below. Once a feature has been marked, it is added to the one key access list.

The current one key access list is displayed by pressing the up arrow key while viewing the home screen (FIG. 1). FIGS. 5a and 5b show the one key access list after "Std ring", "Ring ON/OFF", "Lock phone", and "Ring volume" have been marked. If the user wants direct access to the ring ON/OFF feature, for example, "2. Ring ON/OFF" is selected using one of the methods described previously, and the screen shown in FIG. 5c or FIG. 5d appears, depending on the current status of this feature. The feature's status may be changed by pressing the right arrow key ("CHANGE"). "OK" (left arrow key) is used to confirm any change, and the home screen shown in FIG. 1 reappears. "UNMARK" (up arrow key) may be used to remove this feature from the one key access list. Confirmation is required before the feature is removed.

There are several ways in which a feature can be added to the one key access list. One way is to go through the menus and at the end of a branch in a menu tree, mark the feature for inclusion for the one key access list. For example, at the home screen (see FIG. 1) the user can select MENU, and FIGS. 4a and 4b will be displayed. If the user selects "1. Ring", FIG. 5e will be displayed, at which the user could select "2. Type of ring". Then, at the screen of FIG. 5f, the user could select "2. Vibration" to display FIG. 5g. At FIG. 5g, the user could add vibration ringing to the one key access list by MARKing vibration with the up arrow key. At this point, the user will be asked to confirm that it is OK to add this to the one key access list (see FIG. 5h). If the user select OK, the user is returned to FIG. 5g. FIG. 5g will now show "UNMARK" instead of "MARK". Also, a small icon (Mrk.) will appear on the main screen (see FIG. 1) next to the OPT icon. The vibration ring feature could be removed from the one key access list when viewing the screen of FIG. 5g by depressing the up arrow key to UNMARK vibration then confirming that vibration should be removed from the one key access list.

Methods other than those described above may be used to add and delete items from the one key access list. An ADD function similar to those described previously for the calling card and protected numbers features, for example, could be added to the 1-KEY screen's task bar in FIGS. 5a and 5b. Marking could be done by entering a numeric designation, memory location, or name for the feature to be added using an input screen similar to the one shown in FIG. 4f, for example. Similarly, items in the list can be deleted by using the REMOVE function (FIGS. 5a and 5b). This function prompts the user to enter the list item number for the item to be deleted and then requests confirmation. Although not specifically illustrated here, directory listings, phone numbers, menu, etc. could also be marked for placement in the one key access list. Any individual screen is potentially markable for placement in the one key access list.

A move feature will now be described with reference to FIGS. 6a–6f. The move feature allows the user to rearrange items in lists, such as the one key access list, the directory frequently call numbers, protected numbers and the calling card list. Referring to FIGS. 5a and 5b, records in the one-key access list can be moved (the MOVE feature will be available) by depressing the OPTions key once. Referring to FIGS. 6a and 6b, records in the frequently called number directory can be moved by depressing the OPTions key twice. Referring to FIGS. 3b and 3c, records in the protected numbers directory can be moved by depressing the OPTions key twice. As an example, refer to FIG. 5a in which "Lock phone" is in position #3 within the one key access list. To move "Lock phone" from third position to the second position, the OPTions key is depressed once, followed by the left arrow key. The screen shown in FIG. 6c is then displayed requesting the user to enter the item to be moved. The user depress three on the keypad to select "Lock phone" as the item to be moved. The screen shown in FIG. 6d is then displayed. At this screen, the user has the choice to move "Lock phone" UP, DOWN, or END MOVE. Moving "Lock phone" UP displays the list as it will appear after the move is completed (see FIG. 6e). Note that "Lock phone" is in the second position. The position can be further moved up or down. The pointer will stay next to the Lock phone listing, and the Lock phone listing will be shown in its new location with its new number. If the user is satisfied with "Lock phone" in the second position, END MOVE can be selected by depressing the up arrow key. This causes the list to be redisplayed, as moved. By comparing FIGS. 6f and 5a, it is apparent that "Lock phone" has been moved from the third position to the second position.

While the invention has been described in connection with the preferred embodiments, it will be understood that modifications within the principles outlined above will be evident to those skilled in the art. Thus, the invention is not limited to the preferred embodiments, but is intended to encompass such modifications.

What is claimed is:

1. A wireless telephone comprising:
   a first directory having assigned memory locations with indicators associated therewith, to store entries in respective memory locations, each entry including a telephone number;
   a display to display a list of entries stored in the first directory;
   a move device to reorder the entries stored in the first directory, the move device visually offsetting one entry such that one visually offset entry appears on the display together with other entries listed and upon input from a user the move device moving the visually offset entry on the display with respect to the other entries listed and causing the display to display the list of entries, including the visually offset entry, as reordered, the reordered entries being assigned to new memory locations;
   a speed dialer to place a call to one of the telephone numbers stored in the memory locations of first directory upon entry of the indicator associated with the memory location;
   a second directory; and
   a sorting unit to arrange telephone numbers according to parameters respectively associated with the telephone numbers and store the telephone numbers as arranged in the second directory.

2. A wireless telephone according to claim 1, wherein the sorting unit alphabetizes the parameters to arrange the telephone numbers.

3. A wireless telephone according to claim 1, further comprising a copy device to selectively copy telephone numbers from the first directory to the second directory and copy telephone numbers from the second directory to the first directory.

4. A wireless telephone according to claim 1, wherein each entry includes a telephone number and an entry name, the list displayed by the display being a list of entry names.

5. A wireless telephone according to claim 4, further comprising a scroller to allow a user to scroll up and down through the list of entries displayed on the display and to sequentially view on the display the telephone numbers of the entries.

6. A phone according to claim 5, wherein the scroller changes the display upon selection of an entry by a user to cause the telephone number and entry name of the entry selected to be displayed together, the wireless telephone further comprising a page changer to change the entry being displayed, pagewise, as arranged.

7. A wireless telephone according to claim 1, wherein the telephone numbers and parameters associated therewith are stored in the second directory as entries, the wireless telephone further comprising:
   a search engine to receive an input from a user, search for the input through the entries stored in the second directory and display a list of the entries most closely corresponding to the input; and
   a record caller to cause the display to display the telephone number of one of the entries listed by the display; and
   a page changer to change the telephone number being displayed by the record caller, pagewise, as arranged in the second directory.

8. A wireless telephone comprising:
   a directory to hold a plurality of entries, each entry having a number and an associated alphanumeric identifier;
   a sorting unit to arrange the entries according to the alphanumeric identifiers and to store the numbers and alphanumeric identifiers, as arranged, in the directory;
   a display to display the alphanumeric identifiers of a plurality of entries or the number and alphanumeric identifier of a single entry;
   a scroller, operable when the display displays alphanumeric identifiers of a plurality of numbers, to scroll up and down through the alphanumeric identifiers such that upon selection of an alphanumeric identifier by a user, a selected entry is chosen and the scroller changes the display to cause the number and alphanumeric identifier of the selected entry to be displayed together; and
   a page changer to change the entry being displayed, pagewise, as arranged in the directory.

9. A wireless telephone according to claim 8, wherein the sorting unit alphabetizes the alphanumeric identifiers to arrange the numbers.

10. A wireless telephone according to claim 8, wherein a personal identifier is required to view the numbers.

11. A wireless telephone according to claim 8, further comprising:
    a search engine to receive an input from a user, search for the input through the alphanumeric identifiers in the directory and display the alphanumeric identifiers most closely corresponding to the input; and
    a record caller to cause the display to display the number and alphanumeric identifier of an entry corresponding to one of the alphanumeric identifiers retrieved in the search.

12. A wireless telephone according to claim 11, wherein the alphanumeric identifiers have first and second word portions, the search engine searching for the input in both the first and second word portions.

13. A wireless telephone according to claim 8, wherein the alphanumeric identifier consists of letters.

14. A wireless telephone according to claim 8, wherein the page changer can change the entry being displayed directly without switching the display to a plurality of entries.

15. A wireless telephone comprising:
   a plurality of telephone function keys;
   a telephone display having an information field and a function field, the function field identifing the function of the function keys, the telephone display having an identifier, the identifier being activated when the function keys have a plurality of functions and being deactivated when the function keys do not have a plurality of functions; and
   a telephone switching key for changing the display in the function field and the function of the function keys.

16. A wireless telephone according to claim 15, wherein a single function can be activated by a plurality of different function keys at different times.

17. A wireless telephone, comprising:
   a directory to hold entries, each entry having a predetermined number and an empty place holder;
   a display to request the user to enter a variable number for insertion into the empty place holder, when the entry thereof is accessed; and
   a transmitter to transmit the predetermined number and to transmit the variable number after transmitting the predetermined number,
   the directory further holding entry names, the entry names respectively having associated predetermined numbers and empty place holders, the display displaying the entry names in a list.

18. A wireless telephone according to claim 17, wherein a personal identifier is required to access the directory.

19. A wireless telephone according to claim 17, wherein each entry in the directory can include an alphanumeric code together with the predetermined number and the empty place holder, the alphanumeric code and empty place holder being entered in an order determined by a user, the transmitter transmitting the alphanumeric code and variable number in an order based on the entry order determined by the user.

20. A wireless telephone according to claim 19, wherein the transmitter delays before transmitting the alphanumeric code and delays before transmitting the variable number, the user determining the length of the delays.

21. A wireless telephone according to claim 12, further comprising a move device to reorder the entry names with respect to one another, the move device visually offsetting one entry name such that one visually offset entry name appears on the display together with other entry names and upon input from a user, the move device moves the visually offset entry name on the display with respect to other entry names listed and causes the display to list the entry names, including the visually offset entry name, as reordered.

22. A wireless telephone according to claim 17, wherein the transmitter delays between transmitting the predetermined number and the variable number, the user determining the length of the delay.

23. A wireless telephone according to claim 17, further comprising a separate number directory, the user entering the variable number by accessing the separate number directory.

24. A wireless telephone comprising:
   a function setting device for setting a plurality of different parameters;
   a marking device for selectively marking one or more of the different parameters;
   a display to display a list of the one or more different parameters which have been marked; and
   a selector to select a parameter from the list displayed by the display to thereby enable changing the setting of the selected parameter such that the phone can place and receive a plurality of calls operating with the changed parameter.

25. A wireless telephone according to claim 24, further comprising:
   a move device, accessible when a plurality of parameters have been marked, to reorder list of the plurality of parameters with respect to one another, the move device visually offsetting one of the parameters which have been marked, such that one visually offset parameter appears on the display together with other parameters listed and upon input from a user, the move device moves the visually offset parameter on the display with respect to the other parameters listed and causes the display to display the list of parameters which have been marked, including the visually offset parameter, as reordered.

26. A wireless telephone according to claim 24, wherein the parameters displayed by the display and selected by the selector include at least one parameter selected from the group consisting of type of ring, phone locking and ring volume.

27. A wireless telephone comprising:
   a menu list of items corresponding to respective telephone functions;
   a telephone display to display the menu list of items such that each item is displayed together with a label associated therewith;
   a first activation device to visually offset one item from the list of items displayed, to scroll through on the display the list of items with a visual offset moving from item to item with scrolling and to select an item being visually offset upon input from a user to thereby activate the telephone function corresponding to the item selected; and
   a second activation device operable when a user enters the label of an item, to select the item associated with the label entered by the user and thereby activate the telephone function corresponding to the item.

28. A wireless telephone according to claim 27, further comprising a move device to reorder the list of items, the move device visually offsetting one item from the list of items such that one visually offset item appears on the display together with other items listed and upon input from a user, the move device moving the visually offset item with respect to other items listed and causing the display to display the list of items, including the visually offset item, as reordered.

29. A wireless telephone, comprising:
   a directory to hold entries, each entry having a predetermined number and an empty place holder;
   a display to request the user to enter a variable number for insertion into the empty place holder, when the entry thereof is accessed; and
   a transmitter to transmit the predetermined number and to transmit the variable number after transmitting the predetermined number, the transmitter delaying between transmitting the predetermined number and the variable number, the user determining the length of the delay.

30. A wireless telephone, comprising:

a directory to hold entries, each entry having a predetermined number and an empty place holder;

a separate number directory;

a display to request the user to enter a variable number for insertion into the empty place holder, when the entry thereof is accessed, the user entering the variable number by accessing the separate number directory; and a transmitter to transmit the predetermined number and to transmit the variable number after transmitting the predetermined number.

* * * * *

UNITED STATES PATENT AND TRADEMARK OFFICE
CERTIFICATE OF CORRECTION

PATENT NO.: 6,125,287
DATED : September 26, 2000
INVENTOR(S): William H. CUSHMAN et al.

It is certified that an error appears in the above-identified patent and that said Letters Patent is hereby corrected as shown below:

Column 13, line 46, change "claim 12" to --claim 17--.

Signed and Sealed this

Eighth Day of May, 2001

Attest:

NICHOLAS P. GODICI

Attesting Officer     Acting Director of the United States Patent and Trademark Office